United States Patent
Noraz et al.

(10) Patent No.: US 9,245,491 B2
(45) Date of Patent: Jan. 26, 2016

(54) FIRST DE-COMPRESSING FIRST COMPRESSING SCHEMES FOR PIXELS FROM/TO BUS INTERFACE

(71) Applicant: TEXAS INSTRUMENTS INCORPORATED, Dallas, TX (US)

(72) Inventors: Frederic Jean Noraz, Gattieres (FR); Maija Kristiina Kuusela, Mouans Sartoux (FR); Franck Seigneret, Saint-Jeannet (FR)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 461 days.

(21) Appl. No.: 13/715,720

(22) Filed: Dec. 14, 2012

(65) Prior Publication Data

US 2014/0168361 A1 Jun. 19, 2014

(30) Foreign Application Priority Data

Dec. 13, 2012 (EP) .................................... 12290439

(51) Int. Cl.
*H04N 13/00* (2006.01)
*G09G 5/00* (2006.01)
*G06T 9/00* (2006.01)

(52) U.S. Cl.
CPC ... *G09G 5/00* (2013.01); *G06T 9/00* (2013.01)

(58) Field of Classification Search
CPC .......... G09G 5/363; G09G 5/395; G06T 1/60; H04N 13/0048
See application file for complete search history.

(56) References Cited

U.S. PATENT DOCUMENTS

| 5,903,253 | A | 5/1999 | Mizutome et al. |
| 6,072,832 | A * | 6/2000 | Katto ....................... 375/240.28 |
| 7,928,989 | B1 | 4/2011 | Brown et al. |
| 2002/0135585 | A1* | 9/2002 | Dye et al. ...................... 345/531 |
| 2004/0061791 | A1* | 4/2004 | Terada ....................... 348/231.2 |
| 2008/0111825 | A1 | 5/2008 | Torzewski et al. |
| 2008/0150951 | A1 | 6/2008 | Tuomi |
| 2012/0120057 | A1 | 5/2012 | Cho et al. |

* cited by examiner

*Primary Examiner* — Huy T Nguyen
(74) *Attorney, Agent, or Firm* — Lawrence J. Bassuk; Frank D. Cimino

(57) ABSTRACT

A multimedia system includes a processor coupled to a memory, a three-dimensional (3D) graphics engine to generate 3D graphics content, and a display controller to process and transport pixel data for transmission to a display via a display interface. Each of the processor, the 3D graphics engine, and the display controller accesses pixel data stored in the memory using a common decompression scheme. Additionally, each of the processor, the 3D graphics engine, and the display controller stores pixel data in the memory using a common compression scheme.

10 Claims, 3 Drawing Sheets

FIRST DE-COMPRESSING FIRST COMPRESSING SCHEMES FOR PIXELS FROM/TO BUS INTERFACE

CROSS-REFERENCE TO RELATED APPLICATION

The present application claims priority to European Patent Application No. 12290439.4, filed on Dec. 13, 2012; which is hereby incorporated herein by reference.

BACKGROUND

Modern computer user interfaces make use of multiple application layers in order to present to the user a richer content. These application layers used during screen composition are generated by the active applications. One application may create one or more layers. For example, user interface designers may prefer certain windows or portions of windows to be semi-transparent for both aesthetic and functional reasons. An example of an aesthetic benefit is enabling a user to view at least some of a background layer through a portion of a foreground layer, which enhances the look and feel of the user interface. An example of a functional benefit is enabling a user to view information from a background layer through a portion of a foreground layer, which would otherwise be obstructed by the foreground layer.

In these cases, certain pixels (e.g., those that appear semi-transparent) of the user interface composition include pixel data from more than one application. The amount of pixel data that is required to be read from and written to memory by various system components increases with the number of applications that contribute to a particular user interface composition. Additionally, the desire for increasingly-high refresh rates and screen resolutions place a further burden on the amount of pixel data that is read from and written to memory. Power consumption is a function of the amount of pixel data required to be read from and written to memory and, as a result, power consumption increases and memory bandwidth becomes a limiting factor.

SUMMARY

Embodiments of the present disclosure are directed to a multimedia system that includes a processor coupled to a memory, a three-dimensional (3D) graphics engine to generate 3D graphics content, and a display controller to process and transport pixel data for transmission to a display via a display interface. Each of the processor, the 3D graphics engine, and the display controller accesses pixel data stored in the memory using a common decompression scheme. Additionally, each of the processor, the 3D graphics engine, and the display controller stores pixel data in the memory using a common compression scheme.

Other embodiments of the present disclosure are directed to a method including accessing and subsequently decompressing, by a three-dimensional (3D) engine, pixel data stored in a memory. The method also includes processing, by the 3D engine, the pixel data and compressing and subsequently transmitting, by the 3D engine, the processed pixel data to a display controller. Further, the method includes decompressing and subsequently converting, by the display controller, the processed pixel data to a format suitable for transmission to a display via a display interface. The compressing and decompressing of data is performed using a common compression scheme and a common decompression scheme, respectively.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
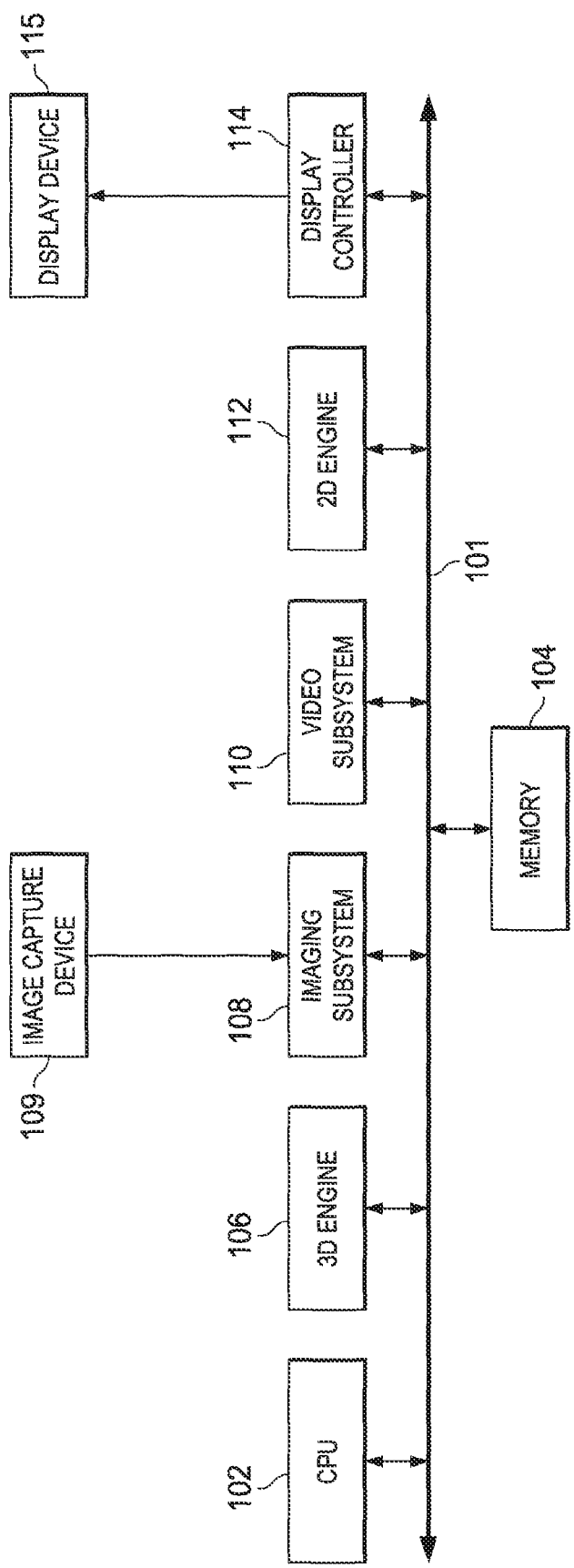
FIG. 1 shows a block diagram of a multimedia system in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device or component couples to a second device or component, that connection may be through a direct electrical connection, or through an indirect electrical connection via other devices and connections.

As used herein, the term "pixel data" refers to the content of a digital image. Digital images may be acquired (e.g., by an image sensor), decoded (e.g., by a video decoder), or synthetically generated (e.g., using three-dimensional (3D) graphics generation). Pixel data are typically stored in system memory (e.g., SDRAM) and are transmitted to a display for visualization.

As used herein, the term "display data" refers to the data that ultimately is displayed on a display device of a computer system. Pixel data becomes display data when it is on the display for visualization.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain user interface composition solutions utilize compression and decompression in a localized manner to reduce the memory footprint of pixel data. That is, a particular functional block (e.g., a three-dimensional (3D) engine, a two-dimensional (2D) engine, or a video controller) in a broader multimedia system uses a compression scheme when writing pixel data to memory and a corresponding decompression scheme when reading pixel data from memory. This enables the pixel data to be stored at a system memory in a way that reduces the memory footprint, since the pixel data is compressed. However, when the pixel data is sent to another functional block, which does not utilize the compression/ decompression scheme explained above, the pixel data must be sent in an uncompressed manner so that the other functional block may properly interpret the data. Thus, while the memory footprint of the pixel data is minimized when read and/or written by the functional block that employs the compression/decompression scheme, the memory bandwidth utilized when transferring pixel data between functional blocks cannot be reduced. As a result, and as explained above, power consumption (which is a function of the amount of pixel data transmitted) is not reduced and memory bandwidth becomes a limiting factor as the demand for higher-resolution displays and higher refresh rates increase. These problems are compounded by the current trend to multi-layer or multi-application composition scenarios, where pixel data from multiple layers or applications is needed to generate a corresponding pixel on a display.

In accordance with various embodiments of the present disclosure, an end-to-end compression/decompression scheme is employed in a multimedia system, such that each functional unit of the system utilizes a common compression and/or decompression scheme, enabling pixel data to be transmitted in a compressed manner between functional units. As a result, the amount of pixel data transferred between functional units or between a functional unit and memory is reduced, and thus the power consumption of the overall system is reduced as well. Additionally, more pixel data may be transferred between functional units for a given amount of bandwidth and more pixel data may be transferred between a functional unit and memory for a given amount of memory bandwidth, thus enabling more complex user interface composition scenarios where display data is generated from the pixel data of multiple applications.

Turning now to FIG. 1, a multimedia system 100 is shown in accordance with various embodiments. The system 100 includes a central processing unit (CPU) 102 and system memory 104. The system also includes a 3D engine 106, an imaging subsystem 108, a video subsystem 110, a 2D engine 112, and a display controller 114. A bus or interconnect 101 couples the functional units of the system 100 to enable data to be transferred between the various functional units.

The CPU 102 and the system memory 104 communicate via the interconnect 101. In some embodiments, the CPU 102 executes an operating system and runs various native applications and drivers for multimedia accelerators, such as the 3D engine 106, imaging subsystem 108, video subsystem 110, 2D engine 112, and display controller 114. The CPU 102 also is responsible for allocation of the memory 104 to applications running on a device that includes the multimedia system 100, such as a personal electronic device (e.g., a cellular telephone, a portable tablet, or a personal digital assistant) or computer. The CPU 102 reads various data from the memory 104, performs processing on the data, and writes various data back to the memory 104.

In accordance with various embodiments, the CPU 102 interfaces with a 3D graphics engine 106 (which may be referred to as a graphics processing unit (GPU) to access and manipulate various pixel data from the memory 104. The GPU reads compressed pixel data from the memory 104 such that the amount of data transferred via the interconnect 101 is reduced as compared to if the pixel data stored in the memory 104 were not compressed. The GPU may then decompress the compressed pixel data and transmit the decompressed data to the CPU 102 to perform operations on the decompressed pixel data. Each pixel may be modified individually by a program executing on the CPU 102. Subsequently, the CPU 102 transmits the processed data to the GPU, which re-compresses the pixel data and stores the compressed pixel data at the memory 104. In this way, the amount of data transferred via the interconnect 101 both from the memory 104 to the GPU and from the GPU to the memory 104 is reduced. At the same time, any programs executing on the CPU 102 may perform signal processing operations on decompressed pixel data, maintaining the simplicity of such signal processing operations.

The 3D engine 106 generates 3D graphics content, such as user interface content, acceleration for native application rendering (e.g., rendering graphics in a web browser), 3D gaming content, and the like. The 3D engine 106 may comprise a programmable hardware block, such as a shader unit. The 3D engine 106 reads various data from the memory 104, performs processing on the data, and writes various data back to the memory 104.

In accordance with various embodiments, the 3D engine 106 reads compressed pixel data from the memory 104 such that the amount of data transferred via the interconnect 101 is reduced as compared to if the pixel data stored in the memory 104 were not compressed. The 3D engine 106 may then decompress the compressed pixel data and perform signal processing operations on the decompressed pixel data, and each pixel may be modified individually by a program executing on the 3D engine 106. Subsequently, the 3D engine 106 re-compresses the pixel data and stores the compressed pixel data at the memory 104. In this way, the amount of data transferred via the interconnect 101 both from the memory 104 to the 3D engine 106 and from the 3D engine 106 to the memory 104 is reduced.

Additionally, in accordance with various embodiments, the compression and decompression schemes used by both the CPU 102 and the 3D engine 106 are the same. As a result, because both functional units are able to decompress data that the other has compressed, pixel data transferred via the interconnect 101 may always be transferred in compressed form, thereby reducing the memory bandwidth required for various image processing tasks of the multimedia system 100. Further, because the amount of data required to be transmitted via the interconnect 101 for a given processing task (e.g., processing a high-definition image stream at a specified refresh rate), power consumption of the multimedia system 100 is also reduced.

The display controller 114 receives pixel data and converts the pixel data into a format that is suitable for transmission over a display interface (e.g., HDMI, component video, composite video, display serial interface (DSI), DisplayPort, or other video connector formats) or a wireless connection (e.g., IEEE 802.11x) for subsequent display by a display device 115. For example, the display controller 114 reads pixel data from a frame buffer and sends the pixel data to the display device 115 over an HDMI cable. In some embodiments, the display controller 114 may perform processing on the pixel data prior to transmission to the display device 115.

In accordance with various embodiments, the display controller 114 reads compressed pixel data from the memory 104, or receives compressed pixel data from another functional unit (e.g., the 3D engine 106) such that the amount of data transferred via the interconnect 101 is reduced as compared to if the pixel data were not compressed. The display controller 114 may then decompress the compressed pixel data and convert the decompressed pixel data into a format that is suitable for transmission over a display interface or a wireless connection. In some cases, particularly where a wireless connection is employed, the display controller 114 may re-compress the data and store the compressed pixel data at the memory 104. In this way, the amount of data transferred via the interconnect 101 is reduced.

As above, the compression and decompression schemes used by the display controller 114 are the same as those used by the CPU 102 and the 3D engine 106. As a result, pixel data transferred via the interconnect 101 for eventual display on a display device may always be transferred in compressed form, thereby reducing the memory bandwidth required for various image processing and display tasks of the multimedia system 100. Further, because the amount of data required to be transmitted via the interconnect 101 for a given processing task, power consumption of the multimedia system 100 is also reduced.

The 2D engine 112 performs 2D imaging operations, such as translation, scaling, rotation, color conversion, blending and the like of various graphics layers. In accordance with various embodiments, the 2D engine 112 reads compressed pixel data from the memory 104, or receives compressed pixel data from another functional unit (e.g., the imaging subsystem 108) such that the amount of data transferred via the interconnect 101 is reduced as compared to if the pixel data were not compressed. The 2D engine 112 may then decompress the compressed pixel data and perform various 2D imaging operations on the decompressed pixel data. Subsequently, the 2D engine 112 re-compresses the pixel data and stores the compressed pixel data at the memory 104 or transfers the compressed pixel data to another functional unit. In this way, the amount of data transferred via the interconnect 101 is reduced.

The imaging subsystem 108 receives pixel data from an image or video capture device (e.g., a camera) 109 and performs certain digital signal processing steps on the received pixel data. The imaging subsystem 108 may receive the pixel data by way of a known interconnect, such as a camera serial interface (CSI) or a CMOS camera interface. The output of the imaging subsystem 108 may be sent to any of the CPU 102, memory 104, 3D engine 106, video subsystem 110, 2D engine 112, or display controller 114. In accordance with various embodiments, the imaging subsystem 108 compresses the pixel data prior to transmitting to any of the functional units via the interconnect 101. Additionally, the compression scheme used by the imaging subsystem 108 is the same as those described above. As a result, other functional units can successfully decompress the data sent by the imaging subsystem 108 and the transfer of uncompressed data via the interconnect 101 is avoided. Although described mainly with respect to data compression because the imaging subsystem 108 is primarily a generator of pixel data (i.e., pixel data that is captured by the imaging/video capture device), in some embodiments the imaging subsystem 108 may also decompress pixel data using a common scheme as is explained above.

The video subsystem 110 performs video encoding and decoding (e.g., MPEG-4 or H.264 coding) on pixel data. In accordance with various embodiments, the video subsystem 110 reads compressed pixel data from the memory 104, or receives compressed pixel data from another functional unit (e.g., the imaging subsystem 108) such that the amount of data transferred via the interconnect 101 is reduced as compared to if the pixel data were not compressed. The video subsystem 110 may then decompress the compressed pixel data and perform encoding or decoding operations on the decompressed pixel data. Subsequently, the video subsystem 110 re-compresses the pixel data and stores the compressed pixel data at the memory 104 or transfers the compressed pixel data to another functional unit. In this way, the amount of data transferred via the interconnect 101 is reduced.

Although generally explained as involving transfers between the memory 104 and one of the other functional units, the above discussion is intended to also cover the scenario where a direct transfer of data occurs between functional units (i.e., without data being first stored to and subsequently read from the memory 104). For example, any of the 3D engine 106, the imaging subsystem 108, the video subsystem 110, or the 2D engine 112 may send compressed data directly to the display controller 114. Similarly, when appropriate, any of the 3D engine 106, the imaging subsystem 108, the video subsystem 110, or the 2D engine 112 may send compressed data directly to one another. As explained above, because all of these elements employ common compression and decompression schemes, it is possible for pixel data to be transmitted over the interconnect 101 in a compressed manner, reducing the memory bandwidth required for data transfers as well as reducing the power consumed during such data transfers.

In some embodiments, the multimedia system 100 is implemented as a system on a chip (SOC). In other words, the CPU, system memory 104, 3D engine 106, imaging subsystem 108, video subsystem 110, 2D engine 112, and display controller 114 are integrated into a single chip. The SOC may contain a combination of digital, analog, mixed-signal, and radio-frequency (RF) functions. In alternative embodiments, the multimedia system 100 is implemented as a system in package (SiP) including a number of chips in a single package. Additionally, although not shown in FIG. 1, a display device such as a monitor, touchscreen, or the like may be coupled to the display controller 114 using a display interface (e.g., HDMI, component video, composite video, display serial interface (DSI), DisplayPort, or other video connector formats) or a wireless connection (e.g., IEEE 802.11x).

As explained above, the multimedia system 100 utilizes a common compression scheme and a common decompression scheme. Generating a user interface composition including display data from pixel data of multiple applications is beneficial for both aesthetic and functional reasons. The multimedia system 100 enables a reduction in bandwidth requirements for the interconnect 101 when processing pixel data of multiple applications. Put another way, pixel data from more applications may be incorporated into a user interface composition while reducing the bandwidth required, since the pixel data is transmitted throughout the multimedia system 100 in a compressed manner. As a result, more complex user interface compositions are possible without a corresponding increase in power consumption of the multimedia system 100.

Figure 2:
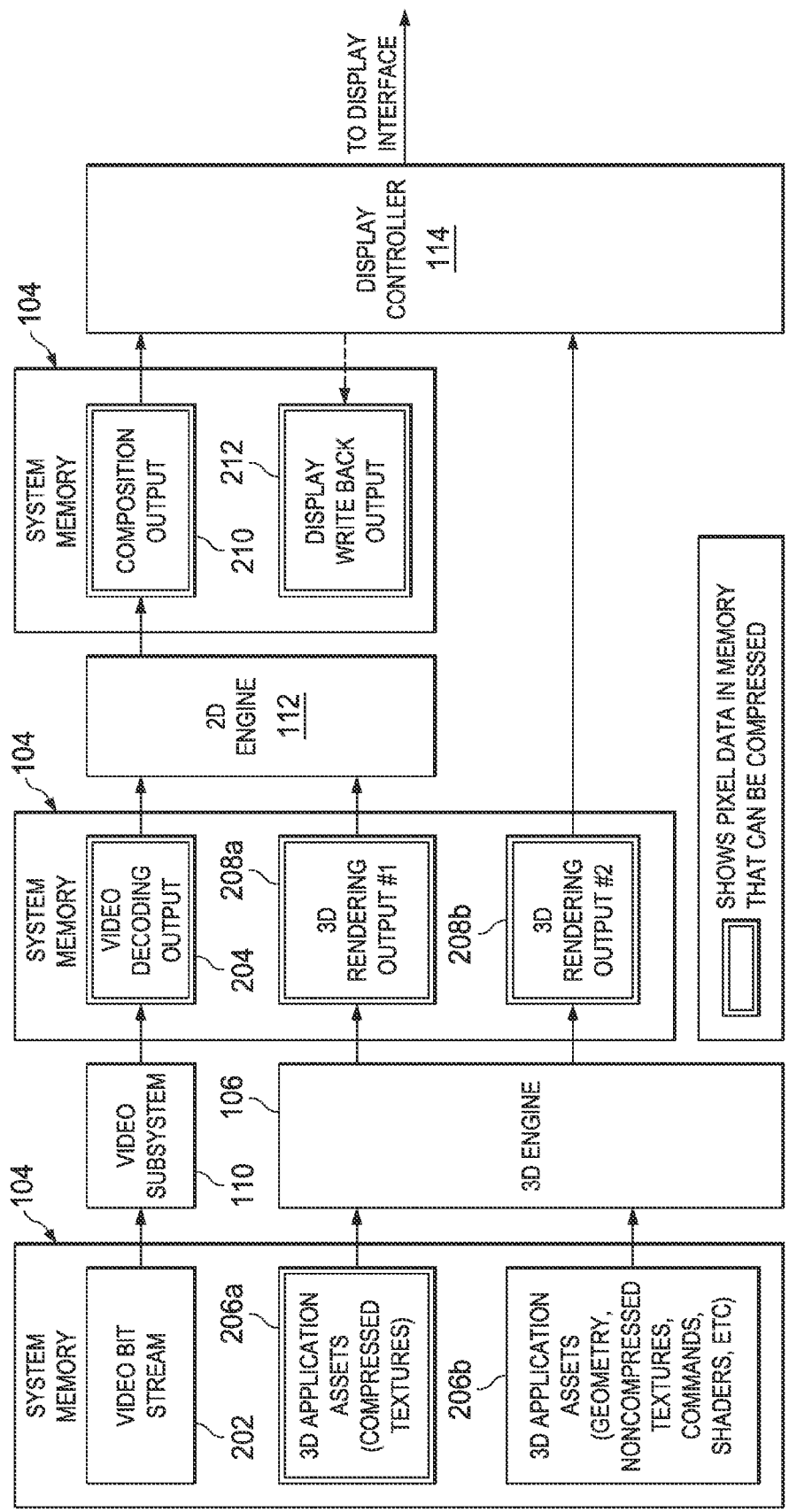
FIG. 2 shows a data flow block diagram of a multimedia system in accordance with various embodiments.

FIG. 2 shows a data flow diagram 200 of the multimedia system 100 of FIG. 1. FIG. 2 is exemplary and intended to explain in further detail situations where the embodiments of the present disclosure are beneficial. A video bit stream block 202 represents video bit stream data that originates from, for example, video media such as a DVD or BluRay disc, or over a wireless network. The video bit stream 202 is compressed and represents a data structure that is stored in system memory 104 and subsequently read by the video subsystem 110. In some embodiments, the video bit stream 202 may travel directly from video media to the video subsystem 110. As explained above, the video subsystem 110 decompresses and subsequently decodes such data. The video subsystem 110 compresses the decoded bit stream, which is represented by the video decoding output block 204. In this way, the data flowing into and out from the video subsystem 110 is in a compressed format. In some embodiments, the video decoding output 204 includes data arranged in YUV422, YUV420, or RGB/ARGB formats.

A second data path begins with the 3D application assets 206a, 206b, which represents one or more image files stored on the system memory 104. Certain 3D application assets 206a, such as textures, may be stored in the system memory 104 in a compressed manner (either using a common compression scheme or a different compression scheme, such as a texture compression format). Other 3D application assets, such as geometry, non-compressed textures, commands, shaders and the like may be stored in the system memory 104 in a non-compressed manner. The 3D engine 106 generates 3D graphics content based on the application assets 206, such as user interface content, acceleration for native application rendering (e.g., rendering graphics in a web browser), 3D gaming content, and the like. The 3D engine 106 reads the application assets 206 from the memory 104, performs processing on the application assets 206, and generates a 3D rendering output 208, which may be written back to the memory 104. As explained above, the application assets 206 are compressed when read by the 3D engine 106, and thus the 3D engine 106 decompresses the application assets 206 prior to performing processing. Additionally, the 3D engine 106 compresses the 3D rendering output 208. In this way, the data flowing into and out from the 3D engine 106 is in a compressed format. As will be explained in further detail below, certain 3D rendering output 208a may be accessed by the 2D engine 112, and certain other 3D rendering output 208b may be accessed directly by the display controller 114.

The 2D engine 112 receives both the video decoding output 204 and the 3D rendering output 208a. As explained above, these are both in a compressed format, such that the amount of bandwidth required for the interconnect 101 is reduced. In accordance with various embodiments, the 2D engine 112 decompresses and combines the data from blocks 204 and 208 to generate the appropriate composition output 210. As above, the composition output 210 is similarly compressed by the 2D engine, reducing the bandwidth required to transmit the composition output 210 to the display controller 114. For example, in some cases the user interface may cause one or more windows to appear semi-transparent, such that a background layer is at least partially visible through a portion of a foreground layer. The pixels that correspond to the portion of the foreground layer thus contain data from multiple layers (i.e., from the background layer and the foreground layer).

In a general screen composition scenario, the 2D engine 112 generates a background layer, which may include at least some animated data. Typically, a status bar is generated near the bottom of the display. A notification layer, which may indicate status information such as battery life, USB connectivity, and the like, is generated in the upper portion of the screen. When a soft keyboard is used, the 2D engine 112 generates a keyboard layer for such purpose. An application layer is also generated, which represents the application that the user is currently accessing. In some cases, an overlay on top of the application layer may contain menus, functional buttons (e.g., media control buttons), and the like.

Figure 3:
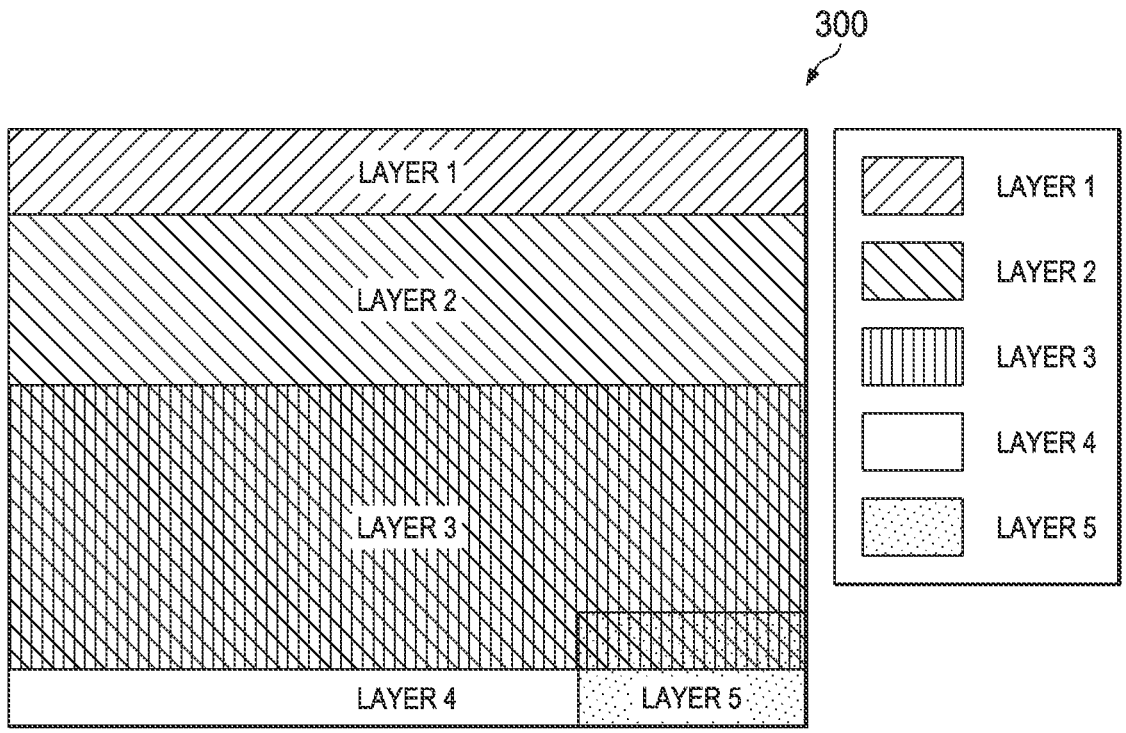
FIG. 3 shows an example of a user interface including multiple layers in accordance with various embodiments.

Referring briefly to FIG. 3, an example of layers used during screen composition 300 is shown in accordance with various embodiments. For example, layer 1 may represent a notification layer as described above. Similarly, layer 4 may represent a status bar, layer 2 may represent an application layer, and layer 3 may represent a soft keyboard layer. While certain layers may be generated from different applications, in some cases a single application generates multiple layers. For example, layer 5 may represent an overlay to the application layer 2. As explained above, the application layer 2 may comprise a media player and the overlay layer 5 contains functional buttons for the media player. The portion of the screen on which layer 5 is positioned includes pixel data from layers 3, 4 and 5 in the present example. As a result of the common compression and decompression schemes used in accordance with various embodiments, complex user interface compositions may be achieved while reducing memory bandwidth when accessing pixel data stored in memory as well as bandwidth between the various functional units shown in FIGS. 1 and 2.

Referring back to FIG. 2, the display controller 114 decompresses the composition output 210 and formats the data for transmission to a display interface. Although not required, in some embodiments the display controller 114 may compress data prior to transmitting the data to the display via the display interface and the display decompresses the data prior to displaying the data. Additionally, the display controller 114 may receive data directly from the 3D rendering output 208b and use such data to perform user interface composition processing prior to transmitting data to the display. In some embodiments, the display controller 114 writes certain data back to the memory 104. This is shown as display write back output 212, which is also compressed prior to transmitting the data to the memory 104.

A common compression and decompression scheme is used throughout the data flow illustrated in FIG. 2. As a result, whenever data is transmitted via the interconnect 101, it is transmitted in compressed form, which all of the functional blocks of FIG. 1 are able to decompress, reducing the bandwidth required for the interconnect 101. As explained above, this enables generating a user interface composition including display data from pixel data of multiple applications while reducing the bandwidth required, since the pixel data is transmitted throughout the system in a compressed manner. As a result, more complex user interface compositions are possible without a corresponding increase in power consumption of the multimedia system 100.

Figure 4:
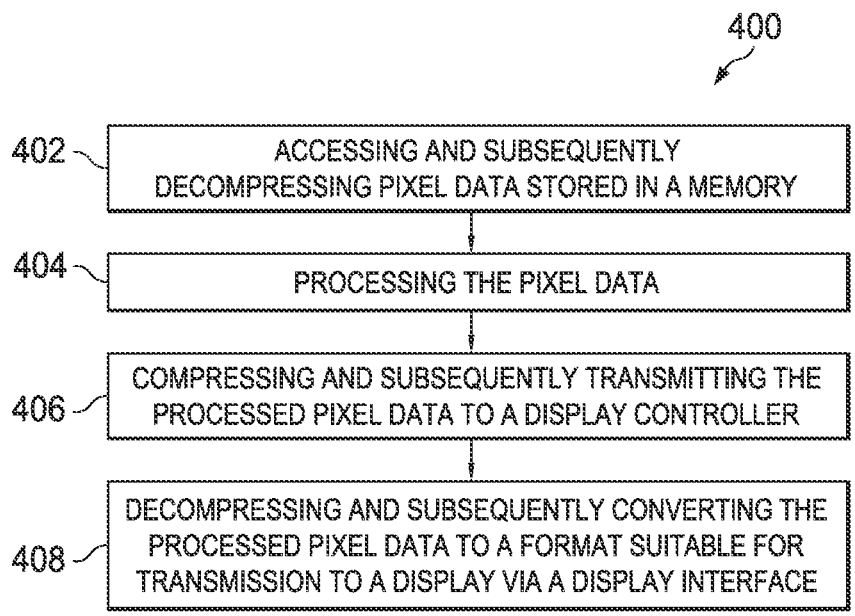
FIG. 4 shows a flow chart of a method in accordance with various embodiments.

FIG. 4 shows a method 400 in accordance with various embodiments. The method 400 begins in block 402 with a 3D engine accessing and subsequently decompressing pixel data stored in a memory. The method continues in block 404 with the 3D engine processing the pixel data. The method further continues in block 405 with the 3D engine compressing and subsequently transmitting the processed pixel data to a display controller. Then, the method continues in block 408 with the display controller decompressing and subsequently converting the processed pixel data to a format suitable for transmission to a display via a display interface. As explained above, the compression and decompression of data is performed using a common compression scheme and a common decompression scheme. As a result, the steps of the method may be performed by many other functional units, which are able to properly decompress compressed data and properly store data in a compressed format that is understandable by other functional units.

The above discussion is meant to be illustrative of the principles and various embodiments of the present invention. Numerous variations and modifications will become apparent to those skilled in the art once the above disclosure is fully appreciated. For example, although the disclosure generally refers to the compression, decompression, and processing of pixel data, one skilled in the art appreciates that the present disclosure is equally applicable to other data formats, including standard data arrays, which may not necessarily represent images. It is intended that the following claims be interpreted to embrace all such variations and modifications.

What is claimed is:

1. A multimedia system comprising:
 a processor having a bus interface, the processor including a first decompression scheme for decompressing pixel data read from the bus interface and a first compression scheme for writing compressed pixel data to the bus interface, the processor operating on decompressed pixel data;

a three-dimensional graphics engine having a bus interface, the three-dimensional graphics engine including the first decompression scheme for decompressing pixel data read from the bus interface and the first compression scheme for writing compressed pixel data to the bus interface, the three-dimensional graphics engine operating on decompressed pixel data to generate three-dimensional graphics content;

a display controller having a bus interface and a display interface, the display controller including the first decompression scheme for decompressing pixel data read from the bus interface, and writes display pixel data to the display interface;

a memory having a bus interface; and a bus coupled to the bus interfaces of the processor, the three-dimensional graphics engine, the display controller, and the memory.

2. The system of claim 1 including a two-dimensional graphics engine having a bus interface coupled to the bus, the two-dimensional graphics engine including the first decompression scheme for decompressing pixel data read from the bus interface and the first compression scheme for writing compressed pixel data to the bus interface, the two-dimensional graphics engine operating on decompressed pixel data to generate two-dimensional graphics content.

3. The system of claim 1 including an imaging system having a source interface and a bus interface coupled to the bus, the imaging system receiving raw pixel data from the source interface and including the first compression scheme for writing compressed pixel data to the bus interface.

4. The system of claim 1 including a video subsystem having a bus interface coupled to the bus, the video subsystem including the first decompression scheme for decompressing pixel data read from the bus interface and the first compression scheme for writing compressed pixel data to the bus interface, the video subsystem operating on decompressed pixel data to encode the decompressed pixel data into a video format.

5. The system of claim 1 including a system on a chip containing the system.

6. A process comprising:

in an imaging subsystem, receiving raw pixel data from a source interface and writing compressed pixel data to a bus interface using a first compression scheme;

in a three-dimensional graphics engine, decompressing pixel data read from the bus interface using a first decompression scheme, operating on decompressed pixel data to generate three-dimensional graphics content, and writing compressed pixel data to the bus interface using the first compression scheme;

in a display controller, decompressing pixel data read from the bus interface using the first decompression scheme and writing display pixel data to a display interface.

7. The process of claim 6 including, in a processor, decompressing pixel data read from the bus interface using the first decompression scheme, operating on decompressed pixel data, and writing compressed pixel data to the bus interface using the first compression scheme.

8. The process of claim 6 including, in a two-dimensional graphics engine, decompressing pixel data read from the bus interface using the first decompression scheme, operating on decompressed pixel data to generate two-dimensional graphics content, and writing compressed pixel data to the bus interface using the first compression scheme.

9. The process of claim 6 including, in a video subsystem, decompressing pixel data read from the bus interface using the first decompression scheme, operating on decompressed pixel data to encode the decompressed pixel data into a video format, and writing compressed pixel data to the bus interface using the first compression scheme.

10. The process of claim 6 including writing the compressed pixel data from the bus interface in a memory, storing the compressed pixel data from the bus interface in the memory, and reading the compressed pixel data on the bus interface from the memory.

* * * * *